United States Patent
Abraham et al.

[15] 3,674,141
[45] July 4, 1972

[54] ARTICLE HANDLING WITH FLUID EJECTION

[72] Inventors: Bruce C. Abraham, Reading; Charles R. Fegley; George B. Lougher, III, both of Laureldale, all of Pa.

[73] Assignee: Western Electric Company, Incorporated, New York, N.Y.

[22] Filed: Dec. 21, 1970

[21] Appl. No.: 100,068

[52] U.S. Cl. .................................. 209/74, 221/211, 221/278
[51] Int. Cl. ................................................. B07c 3/04
[58] Field of Search .................. 209/73, 74, 81, 79; 221/211, 221/212, 278

[56] References Cited

UNITED STATES PATENTS

| | | | |
|---|---|---|---|
| 3,209,908 | 10/1965 | Hopkins | 209/74 R |
| 3,275,136 | 9/1966 | Allen | 209/74 R |
| 3,380,586 | 4/1968 | Frobese | 209/74 R |
| 3,520,177 | 7/1970 | Heitmann | 209/74 R |
| 3,581,890 | 6/1971 | DeMuzio | 209/74 R |

Primary Examiner—Richard A. Schacher
Attorney—W. M. Kain, R. P. Miller and R. Y. Peters

[57] ABSTRACT

Articles are sorted into a plurality of categories in accordance with test results. The articles are picked up on the outer surface of a carrier drum at a loading station and are indexed past a testing station. Test results are stored in a memory.

One of a number of separately actuated air ejection nozzles propels an article away from the outer surface of a drum into a desired chute in accordance with test results stored in the memory.

3 Claims, 2 Drawing Figures

INVENTORS
B.C. ABRAHAM
C.R. FEGLEY
G.B. LOUGHERY III

ARTICLE HANDLING WITH FLUID EJECTION

BACKGROUND OF THE INVENTION

1. Field of the Invention

The invention relates to sorting of articles into various categories in accordance with a plurality of different test results.

2. Description of the Prior Art

In the field of testing discrete electrical components, such as diodes, it is very important to handle the components efficiently and quickly so that the relative time that each component ties up a valuable piece of testing equipment is reduced to an absolute minimum.

One particularly rapid and useful way of testing large numbers of electrical components is disclosed in application Ser. No. 846,110, filed July 30, 1969, now U.S. Pat. No. 3,581,889 issued July 1, 1971, in the names of Messrs. Abraham Fegley and Sels and assigned to the assignee of record for this application. As disclosed in that application, an article, such as a magnetically leaded diode, is carried by a wheel from an input position to a testing location where the article is tested and classified into one of a plurality of categories in accordance with the tests. The characterizations of a test for each category are stored in a memory. The wheel transports the articles past a number of electromagnets which are activated by corresponding outputs of the memory. Activation of an electromagnet attracts an article from the wheel so that it falls into an appropriate output chute and into an output bin corresponding to the testing category.

Another very useful testing and sorting system is disclosed in U.S. Pat. No. 3,209,908, issued Oct. 5, 1965 to S. W. Hopkins. In this patent, articles are inserted into holes in a drum for testing and subsequent sorting. The articles are rejected from their respective holes in the drum by a blast of air from one of a number of different air jets corresponding to the location of various sorting categories.

While these prior art systems are very useful, it is desirable to have even more rapid handling of the components coupled with higher ejection forces without any excessive heating of the ejection expedients.

It is therefore an object of this invention to provide a new system of handling articles wherein the articles are supported on an outer surface of a drum and ejected rapidly from the drum with air ejection.

These and other objects are accomplished by providing a machine with a hollow transporting drum having a magnetically attractive holding station on the outer periphery thereof. A rim of the drum is provided with an aperture at the holding station leading to the hollow interior of the drum. The aperture is positioned so that a portion of the article overlies the aperture when the article is within the holding station. An air ejection unit is mounted within the hollow interior of the drum and is positioned to direct an ejection blast of air through the aperture to remove the article from the drum when desired.

BRIEF DESCRIPTION OF THE DRAWINGS

Other objects and features of the present invention will be more readily understood from the following detailed description of specific embodiments thereof when read in conjunction with the appended drawings in which.

DETAILED DESCRIPTION

Illustratively, the invention will be described in connection with testing and sorting diodes. However, it is to be understood that the inventive apparatus is useful in the transport of many types of articles for many purposes quite diverse from those set forth in the example.

Figure 1:
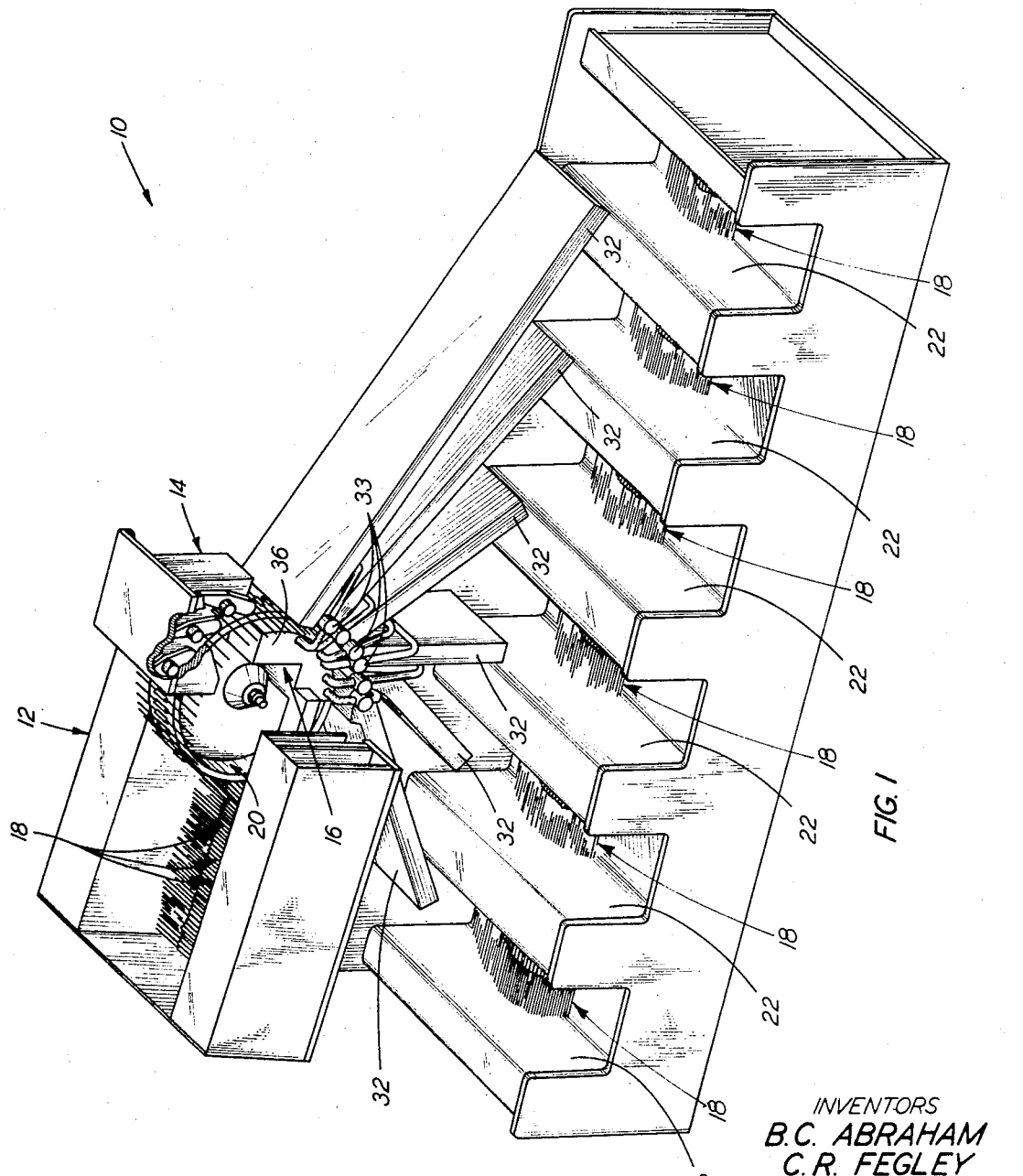
FIG. 1 is an elevational view of a machine for sorting and testing articles embodying the inventive improved ejection apparatus.

A testing and sorting machine, designated generally by the numeral 10, is illustrated in FIG. 1. The machine 10 includes a loading assembly, designated generally by the numeral 12; a testing assembly, designated generally by the numeral 14; and a sorting assembly, designated generally by the numeral 16.

Magnetically-leaded articles or diodes, designated generally by the numeral 18, are engaged with a carrier drum, designated generally by the numeral 20, at the loading station 12. The diodes are then carried to a testing station 14 and ultimately to the sorting station 16 where each of the diodes is ejected into one of a number of bins in accordance with the results of characterization tests performed at the testing station.

The interaction of the loading station 12, the testing station 14 and a memory used to couple the results of the characterization tests to the sorting assembly 16 is disclosed in the aforementioned application Ser. No. 846,110. The invention of the present application, however, differs from that of the application Ser. No. 846,110 in that sorting is accomplished by an air ejection technique rather than by the electromagnetic attraction technique of said Ser. No. 846,110 application.

Figure 2:
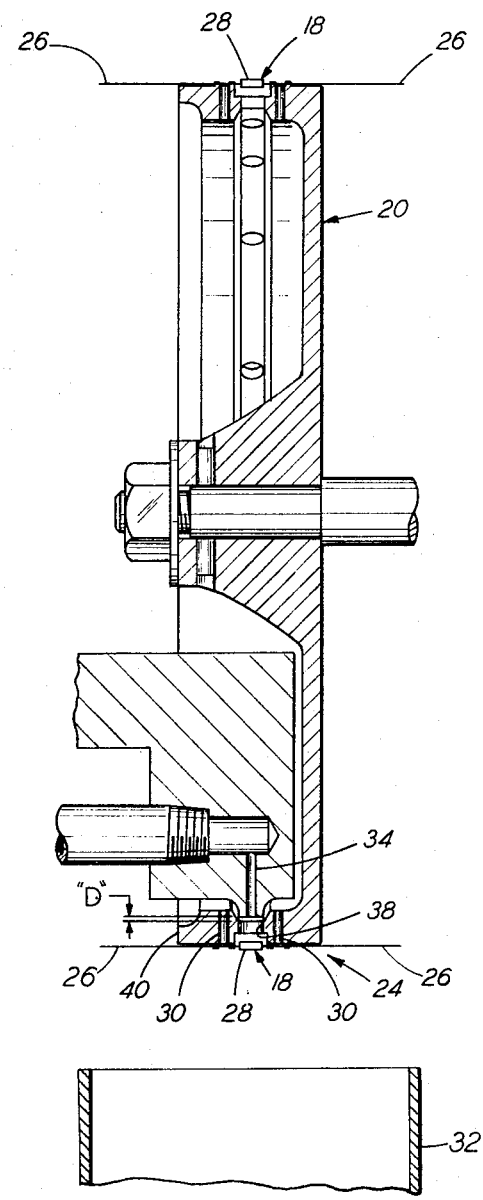
FIG. 2 is a sectional view taken along the lines 2—2 of FIG. 1, showing in detail the ejection nozzle and how an air stream from it is directed against the articles.

FIG. 2 shows one of the diodes 18 engaged with the wheel 20 at a workholding station, designated generally by the numeral 24. The diode 18 has two axially extending leads 26—26 and a body portion 28, which body portion has a diameter substantially larger than that of the leads. The leads are held against the drum 20 by two permanent magnets 30.

Ejection of the diode 18 from the drum 20 occurs when the diode is positioned in alignment with a desired chute 32 leading to one of the bins 22 associated with a particular test characterization of that diode. In accordance with the methods disclosed in application Ser. No. 846,110, a memory system, not shown, provides for actuation of a solenoid valve 33 that results in an air stream flowing through a nozzle 34 to eject the diode 18 into the chute 32. The nozzle 34 is formed by boring a hole into a solid block 36 of metal shaped to substantially conform to the hollow interior of the drum 20. The air stream from the nozzle 34 flows through an aperture 38 within a rim 40 of the wheel 20.

Since there are a number of categories into which the diodes 18 are to be sorted, the block 36 is provided with a plurality of the nozzles 34 formed therein. Each of the nozzles 34 is connected through a tube 42 to one of the remote solenoid valves 33 which is actuated in accordance with signals from the aforementioned memory unit.

EXAMPLE

Apparatus of the above-described structure can operate extremely rapidly and with very accurate results. By way of example, the apparatus is capable of performing testing and sorting operations at the rate of 833 devices per minute on diodes having leads 3-¼ inch long and 0.020 inch in diameter with body portions 0.125 inch long and 0.060 inch in diameter.

In order to sustain such a speed of operation, it is necessary to have extremely reliable solenoid valves since each sorting operation must be accomplished by a discrete operation of one of the solenoid valves 33. An example of a valve found to be suitable for this type of continuous operation is 2013 Valve Assembly from Northeast Fluidics Inc., Bethany, Connecticut.

To prevent undesirable interactions between any one of nozzles 34 and the apertures not precisely corresponding in location to the nozzle during an ejection cycle, it is desirable to limit the spacing between the outer extremity of the nozzle 34 and the inner surface of the rim 40. See dimension "D" in FIG. 2. In this example the spacing was limited to 0.015 inch.

Although certain embodiments of the invention have been shown in the drawings and described in the specification, it is to be understood that the invention is not limited thereto, is capable of modification and can be arranged without departing from the spirit and scope of the invention.

What is claimed is:

1. A machine for handling articles, which comprises:

a hollow transporting drum having a plurality of article-holding stations spaced about the periphery thereof, the holding stations being adapted to magnetically attract the articles, each of the holding stations having an aperture extending through a rim of the drum to the hollow interior thereof, the aperture being positioned so that a portion of the article overlies the aperture;

at least one fluid ejection unit mounted within the hollow interior of the drum and positioned to direct an ejection blast of fluid through at least one of the apertures in the rim of the drum; and means for activating the fluid ejection unit when a desired one of the apertures is aligned therewith whereby the blast of fluid from the unit flows through the aperture and impinges against the article overlying the aperture, thereby ejecting the article from the drum.

2. Apparatus for handling articles having magnetic leads of small diameter extending from both ends of a body portion having a substantially larger diameter, which comprises:

a hollow transporting drum having at least one magnetically attractive article holding station on the outer periphery thereof, the station having an aperture extending through a rim of the drum to the hollow interior thereof, the aperture being positioned so that the body portion of the article overlies the apertures; and an air ejection unit mounted within the hollow interior of the drum and positioned to direct a blast of air radially outward from the center of the drum through the aperture and thereby eject the article from the drum.

3. The apparatus of claim 2 wherein the drum is provided with a plurality of said holding stations and apertures and wherein the air ejection unit is provided with a plurality of nozzles whereby sorting of the articles into various categories can be achieved.

* * * * *